United States Patent
Attar et al.

(10) Patent No.: US 7,924,753 B2
(45) Date of Patent: Apr. 12, 2011

(54) METHOD AND SYSTEM FOR DECODING

(75) Inventors: Rashid A. Attar, San Diego, CA (US);
Peter John Black, San Diego, CA (US);
Jun Ma, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1289 days.

(21) Appl. No.: 11/280,669

(22) Filed: Nov. 15, 2005

(65) Prior Publication Data

US 2007/0110095 A1    May 17, 2007

(51) Int. Cl.
*H04L 5/22* (2006.01)
*H04J 3/16* (2006.01)
*H04J 3/22* (2006.01)

(52) U.S. Cl. .......................... 370/310; 370/465
(58) Field of Classification Search ............... 370/310, 370/465
See application file for complete search history.

(56) References Cited

U.S. PATENT DOCUMENTS

| 6,594,318 B1 | 7/2003 | Sindhushayana et al. |
| 6,987,778 B2 | 1/2006 | Sindhushayana et al. |
| 7,051,268 B1 | 5/2006 | Sindhushayana et al. |
| 2003/0053435 A1 | 3/2003 | Sindhushayana et al. |
| 2004/0151122 A1* | 8/2004 | Lau et al. ............... 370/252 |
| 2006/0268880 A1* | 11/2006 | Zhao et al. ............ 370/394 |

FOREIGN PATENT DOCUMENTS

| EP | 1 429 487 A2 | 6/2004 |
| KR | 2003-36842 | 5/2003 |
| WO | 02/30004 A2 | 4/2002 |
| WO | WO 2004/049661 A1 | 6/2004 |

OTHER PUBLICATIONS

International Preliminary Report on Patentability—PCT/US06/060953, International Search Authority—European Patent Office—Feb. 28, 2008.
International Search Report—PCT/US06/060953, International Search Authority—European Patent Office—Mar. 6, 2007.
Written Opinion—PCT/US06/060953, International Search Authority—European Patent Office—Mar. 6, 2007.

* cited by examiner

*Primary Examiner* — Kevin C Harper
(74) *Attorney, Agent, or Firm* — Sayed H. Beladi

(57) ABSTRACT

Methods and apparatus to decode encoded data. One method starts and stops turbo decoding depending on channel conditions of a received pilot signal. One method may be used with Hybrid Automatic Repeat Request (H-ARQ).

20 Claims, 5 Drawing Sheets

METHOD AND SYSTEM FOR DECODING

BACKGROUND

1. Field

The present invention relates generally to communication systems, and more specifically to decoding received data.

2. Background

Digital information bits may be grouped together to form symbols or packets, which may be processed and transmitted across a communication channel.

DETAILED DESCRIPTION

Figure 1:
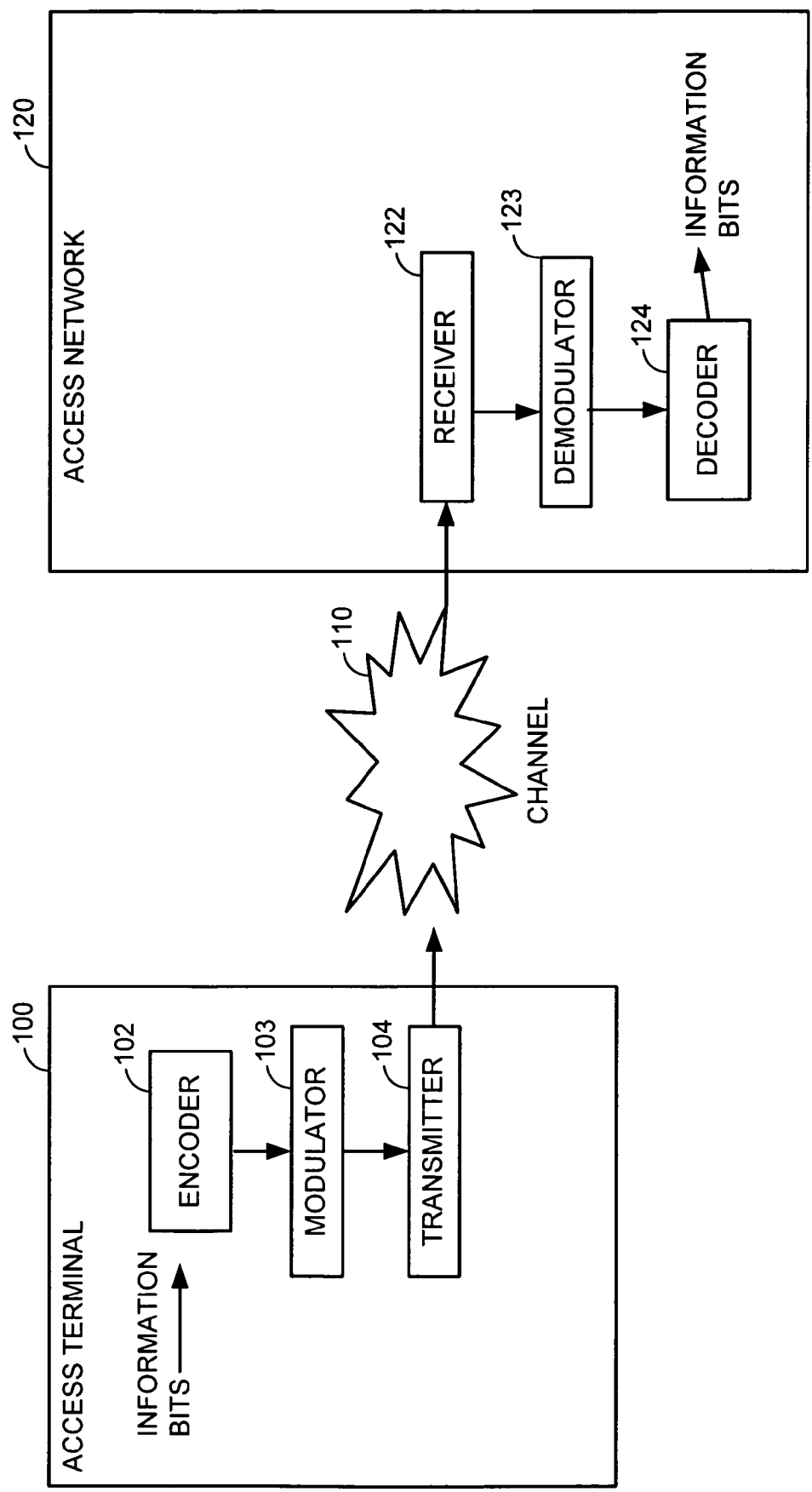
FIG. 1 illustrates a system with an access terminal and an access network.

Any embodiment described herein is not necessarily preferable or advantageous over other embodiments. Various aspects of the present disclosure are presented in the drawings, but the drawings are not necessarily drawn to be all-inclusive.

Information and signals may be represented using a variety of different technologies and techniques. For example, data, instructions, commands, information, signals, bits, symbols, and chips may be referenced by voltages, currents, electromagnetic waves, magnetic fields or particles, optical fields or particles, or any combination thereof. The methods and systems described herein may be applied to any type of signal transmission over a wired or wireless network.

A digital signal may represent, for example, an image signal, a sound signal, a data signal, a video signal, or a multiplex of different signals. A digital signal may be coded and decoded. For example, co-assigned U.S. Pat. No. 6,594,318, entitled "Method And Apparatus For Computing Soft Decision Input Metrics To A Turbo Decoder," describes a coding and decoding system, which is incorporated herein by reference in its entirety.

FIG. 1 illustrates a system with an access terminal 100 and an access network 120, which communicate via a medium or channel 110. The channel 110 may be a real-time, wireless channel. The access terminal 100 comprises an encoder 102, a modulator 103 and a transmitter 104. The access network 120 comprises a receiver 122, a demodulator 123, and a decoder 124. The access terminal 100 and the access network 120 may comprise other elements in addition to or instead of the elements shown in FIG. 1.

The encoder 102 may use an error-correcting code (ECC), such as a turbo code described below, to encode information bits. The modulator 103 may modulate the encoded bits. The transmitter 104 may transmit the modulated, encoded information across the channel 110 to the receiver 122. The demodulator 123 may demodulate the received information. The decoder 124 may comprise a turbo decoder as described below to decode the demodulated information to produce information bits.

The access terminal 100 may be mobile or stationary. Several access terminals may be dispersed throughout a communication system. An access terminal may be connected to or implemented in a computing device, such as a laptop or personal computer. Alternatively, an access terminal may be a self-contained data device, such as a personal digital assistant (PDA). An access terminal may refer to various types of devices, such as a wired phone, a wireless phone, a mobile phone, a cellular phone, a wireless communication personal computer (PC) card, an external or internal modem, etc. An access terminal may be any device that provides data connectivity to a user by communicating through a wireless channel or through a wired channel, such as fiber optic or coaxial cables. An access terminal may have various names, such as mobile station, access unit, subscriber unit, mobile device, mobile terminal, mobile unit, mobile phone, mobile, remote station, remote terminal, remote unit, user device, user equipment, handheld device, etc.

The access network 120 or communication system may provide communication for a number of cells, where each cell may be serviced by one or more base stations. A base station may also be referred to as a base station transceiver system (BTS), an access point, a modem pool transceiver (MPT), or a Node B. Access network 120 may refer to network equipment providing data connectivity between a packet switched data network (PSDN) (e.g., the Internet) and the access terminal 100. The access network 120 may comprise a base station and base station controller (BSC) in a communication system, such as a code division multiple access (CDMA) system.

Forward link (FL) or downlink refers to transmission from an access network 120 to an access terminal 100. Reverse link (RL) or uplink refers to transmission from an access terminal 100 to an access network 120.

The communication system of FIG. 1 may use one or more communication techniques, standards or protocols, such as code division multiple access (CDMA), IS-95, High Rate Packet Data (HRPD), also referred to as High Data Rate (HDR), as specified in "cdma2000 High Rate Packet Data Air Interface Specification," TIA/EIA/IS-856, CDMA 1× Evolution Data Optimized (EV-DO) Release 0 or Revision A, 1×EV-DV, Wideband CDMA (WCDMA), Universal Mobile Telecommunications System (UMTS), Time Division Synchronous CDMA (TD-SCDMA), Orthogonal Frequency Division Multiplexing (OFDM), etc. The examples described below provide details of a communication system. The ideas presented herein are applicable to other systems as well, and the present examples are not meant to limit the present application.

Coding

Transmission of digital data may be prone to interference, which may introduce errors in transmitted data. Error detection schemes may determine whether errors have occurred in transmitted data. Some digital communication systems may encode bits with ECCs before transmission to improve performance gains. For example, a system may add to each data packet a cyclic redundancy check (CRC) field, e.g., a length of 16 or 24 bits, which carries a checksum of data in the packet. When a receiver receives the data, the receiver calculates the same checksum on the received data and verifies whether the result of the calculation is identical to the checksum in the CRC field.

Convolutional codes have been used to allow receivers of digital data to correctly determine the transmitted data even when errors may have occurred during transmission. Convolutional codes introduce redundancy into the transmitted data and pack the transmitted data into packets in which the value of each bit may depend on earlier bits in the sequence. Thus, when errors occur, the receiver can still deduce the original data by tracing back possible sequences in the received data.

To further improve the performance of a transmission channel, some coding schemes include interleavers, which mix up the order of the bits in the packet during coding. Thus, when interference destroys some adjacent bits during transmission, the effect of the interference is spread out over the entire original packet and can more readily be overcome by the decoding process.

Turbo Coding

Other improvements include multiple-component codes that encode the packet more than once, in parallel or in series. For example, a system may employ an error correction method that uses at least two convolutional coders in parallel. Such parallel encoding is referred to as "turbo coding." Turbo codes are serial or parallel concatenations of two or more constituent coders separated by one or more code interleavers. Turbo codes are often decoded with a relatively efficient iterative algorithm to achieve low error rates at signal-to-noise ratios (SNRs) approaching the Shannon limit. Interleavers and deinterleavers are inserted between the component code encoders and decoders, respectively.

An interleaver in a turbo coder interleaves or spreads code words output from an encoder so that individual bits of a given code word are separated from each other and transmitted at different times. Consequently, individual bits of a given code word experience independent fading, i.e., the bits affected by an error burst belong to different code words. At the receiver, the received samples are de-interleaved prior to decoding. Hence, the effect of the error burst is spread over the message so that it is possible to recover the data with the original error-correcting code. The performance of turbo codes depends on the length and structure of the code interleavers used. Various types of interleavers may be used, such as diagonal interleavers, convolutional interleavers, block interleavers, inter-block interleavers, and pseudo-random interleavers. Good turbo code performance may be achieved by using interleavers having pseudo-random structures.

Turbo coding represents an important advancement in the area of forward error correction (FEC). There are many variants of turbo coding, but most types of turbo coding use multiple encoding steps separated by interleaving steps combined with the use of iterative decoding. This combination provides previously unattainable performance with respect to noise tolerance in a communications system. Namely, turbo coding allows reliable communications at lower energy-per-bit per noise power spectral density ($E_b/N_0$) than was previously possible using existing forward error correction techniques.

Iterative Decoding

For multiple-component codes such as turbo codes, optimal decoding may be a very complex task, and may require large periods of time not usually available for on-line decoding. "Iterative decoding" techniques have been developed to overcome this problem. Rather than determining immediately whether received bits are zero or one, the receiver assigns each bit a value on a multilevel scale representative of a probability that the bit is one. One scale, referred to as log-likelihood ratio (LLR) probabilities, represents each bit by an integer in some range, e.g., {−32, 31}. A value of 31 signifies that the transmitted bit was a zero with very high probability, and a value of −32 signifies that the transmitted bit was a one, with very high probability. A value of zero indicates that the logical bit value is indeterminate.

Data represented on the multilevel scale is referred to as "soft data," and iterative decoding is usually soft-in/soft-out, i.e., the decoding process receives a sequence of inputs corresponding to probabilities for the bit values and provides as output corrected probabilities, which takes into account constraints of the code. Generally, a decoder that performs iterative decoding uses soft data from former iterations to decode the soft data read by the receiver. During iterative decoding of multiple-component codes, the decoder uses results from decoding of one code to improve the decoding of the second code. When parallel encoders are used, as in turbo coding, two corresponding decoders may conveniently be used in parallel for this purpose. Such iterative decoding is carried out for a plurality of iterations until it is believed that the soft data closely represents the transmitted data. Those bits that have a probability indicating that they are closer to zero (for example, values between 0 and 31 on the scale described above) are assigned binary zero, and the remaining values are assigned binary one.

An LLR is thus a probability metric used by a turbo decoder to determine whether a given symbol was transmitted given a particular received symbol. To compute the LLR, an accurate estimate of the SNR and the channel coefficient (a complex scale factor applied to the transmitted signal by the channel) may be used. Accurate LLR values are particularly important in turbo decoding applications in which the LLR inputs are subjected to nonlinear operations that can amplify inaccuracies in the LLR values and result in unacceptable decoder performance.

Transmit Process

Figure 2A:
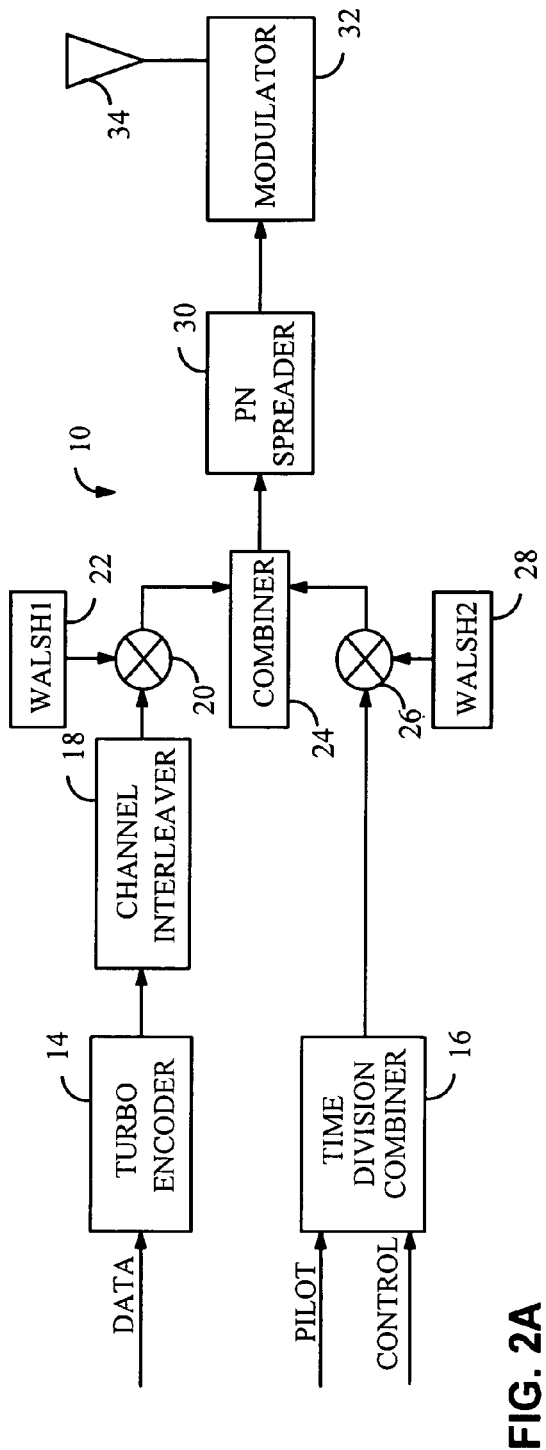
FIG. 2A illustrates a code division multiplex (CDM) transmit unit, which may be implemented in the access terminal of FIG. 1.

FIG. 2A illustrates an example of a code division multiplex (CDM) transmit unit 10 (structure and/or process), which may be implemented in the access terminal 100 of FIG. 1 for reverse link transmission. The functions and components shown in FIG. 2A may be implemented by software, hardware, or a combination of software and hardware. Other functions or components may be added to FIG. 2A in addition to or instead of the functions or components shown in FIG. 2A.

Data signals, such as voice data or other types of data, are provided to an encoder 14, which encodes data bits using one or more coding schemes to provide coded data chips. Each coding scheme may include one or more types of coding, such as cyclic redundancy check (CRC), convolutional coding, turbo coding, block coding, other types of coding, or no coding at all. Coding schemes may be used with automatic repeat request (ARQ), hybrid ARQ (H-ARQ) (described below), and incremental redundancy repeat techniques. Different types of data may be coded with different coding schemes.

The encoder 14 may be a standard turbo encoder and operate in accordance with turbo encoding principles and methods described above. In one embodiment, the encoder 14 is a serial concatenated turbo encoder, in which an interleaver (not shown) is disposed between inner and outer constituent, convolutional encoders (also not shown). In another embodiment, the turbo encoder 14 is a parallel concatenated turbo encoder.

The encoded data bits output from the encoder 14 may be interleaved by a channel interleaver 18 to combat fading. The channel interleaver 18 may comprise a block interleaver.

At least one control signal and a predetermined pilot signal, such as a constant equivalent to 1, may be provided to a time division combiner 16. The control signal may contain information for delivery to a corresponding receiver (FIG. 2B) to facilitate power control and/or code-rate control, which improves communication system efficiency and throughput. The time division combiner 16 may mix the control signal with the pilot signal in accordance with time division combining methods. The combined signal is input to a second multiplier 26, where it is multiplied by a predetermined Walsh function provided via a second Walsh function generator 28. Similarly, the interleaved data signal output from the channel interleaver 18 is provided to a first multiplier 20 where it is multiplied by another predetermined Walsh function provided by a first Walsh function generator 22. The multiplier 20 may spread or cover the encoded data with a Walsh cover (i.e., Walsh code) to form data "chips."

The resulting Walsh codes output from the first multiplier 20 and the second multiplier 26 are combined by a combiner 24, spread via a pseudo random noise (PN) spreader 30, and subsequently modulated and converted to radio frequency by a modulator 32 in preparation for transmission over a channel via an antenna 34. The PN spreader 30 may spread the stream of chips with one or more PN codes, e.g., short code(s) and long code. The modulator 32 may modulate coded, interleaved data to generate modulated data. Examples of modulation techniques include binary phase shift keying (BPSK) and quadrature phase shift keying (QPSK). The modulator 32 may also repeat a sequence of modulated data, or a symbol puncture unit may puncture bits of a symbol.

The resulting signal transmitted via the antenna 34 is a composite signal having a data signal, a pilot signal, and at least one control signal. Once broadcast over a channel, the composite signal may experience multi-path fading and channel interference that should be efficiently detected and compensated for by a receiver that receives the transmitted signal.

The Walsh functions provided by the first Walsh function generator 22 and the second Walsh function generator 28 may be replaced by PN function generators or a combination of Walsh function generators and PN function generators.

Receive Process

Figure 2B:
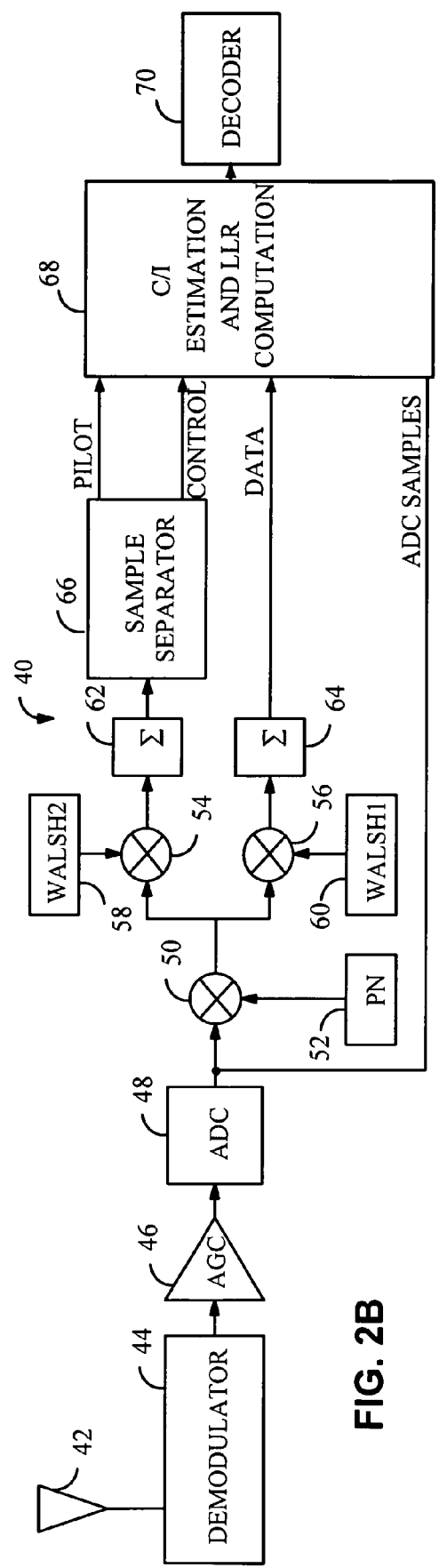
FIG. 2B illustrates a CDM receive unit, which may be implemented in the access network of FIG. 1.

FIG. 2B illustrates a CDM receive unit 40, which may be implemented in the access network 120 of FIG. 1. The functions and components shown in FIG. 2B may be implemented by software, hardware, or a combination of software and hardware. Other functions or components may be added to FIG. 2B in addition to or instead of the functions or components shown in FIG. 2B.

The receive unit 40 comprises a receiver antenna 42, a demodulator circuit 44, an automatic gain control (AGC) circuit 46, an analog-to-digital converter (ADC) 48, which outputs digital samples, a first receiver multiplier 50, a PN sequence generator 52, a second receiver multiplier 54, a third receiver multiplier 56, a second receiver Walsh generator circuit 58, a first receiver Walsh generator circuit 60, first and second accumulators 62, 64, a sample separator and despreader 66, a carrier-signal-to-interference ratio (C/I) estimation and log-likelihood ratio (LLR) computation circuit 68, and a decoder 70, such as a turbo decoder.

The antenna 42 receives a signal, such as a radio frequency (RF) signal, transmitted over a channel by the transmit unit 10 of FIG. 2A. The demodulator may convert the received signal to an intermediate frequency signal and/or a baseband signal. The AGC circuitry 46 may adjust the gain of the baseband signal. The ADC 48 may convert the signal to a digital signal. The first multiplier 50 may multiply the baseband signals by a PN sequence that is related to the PN sequence employed in the PN spreader 30 of FIG. 2A via the PN sequence generator 52. The first multiplier 50 may output a partially despread signal, which is split onto two separate paths.

On one path, the second receiver multiplier 54 multiplies the partially spread sequence by a Walsh function provided by the second receiver Walsh function generator 58. The provided Walsh function is related to the Walsh function provided by the second Walsh function generator 28 of FIG. 2A. The resulting despread signal samples are input to the first accumulator 62, where they are accumulated over a predetermined number of samples. The accumulated despread data samples are provided to the sample separator 66. The sample separator 66 outputs a pilot signal and a control signal extracted from the despread signal to a C/I estimation circuit and LLR circuit, as described in detail below.

Similarly, despread signal samples output from the third receiver multiplier 56 are accumulated by the second accumulator 64, which outputs a data signal comprising data signal samples to the C/I estimation circuit and LLR circuit, as described in detail below.

Hybrid Automatic Repeat Request (H-ARQ)

Figure 3:
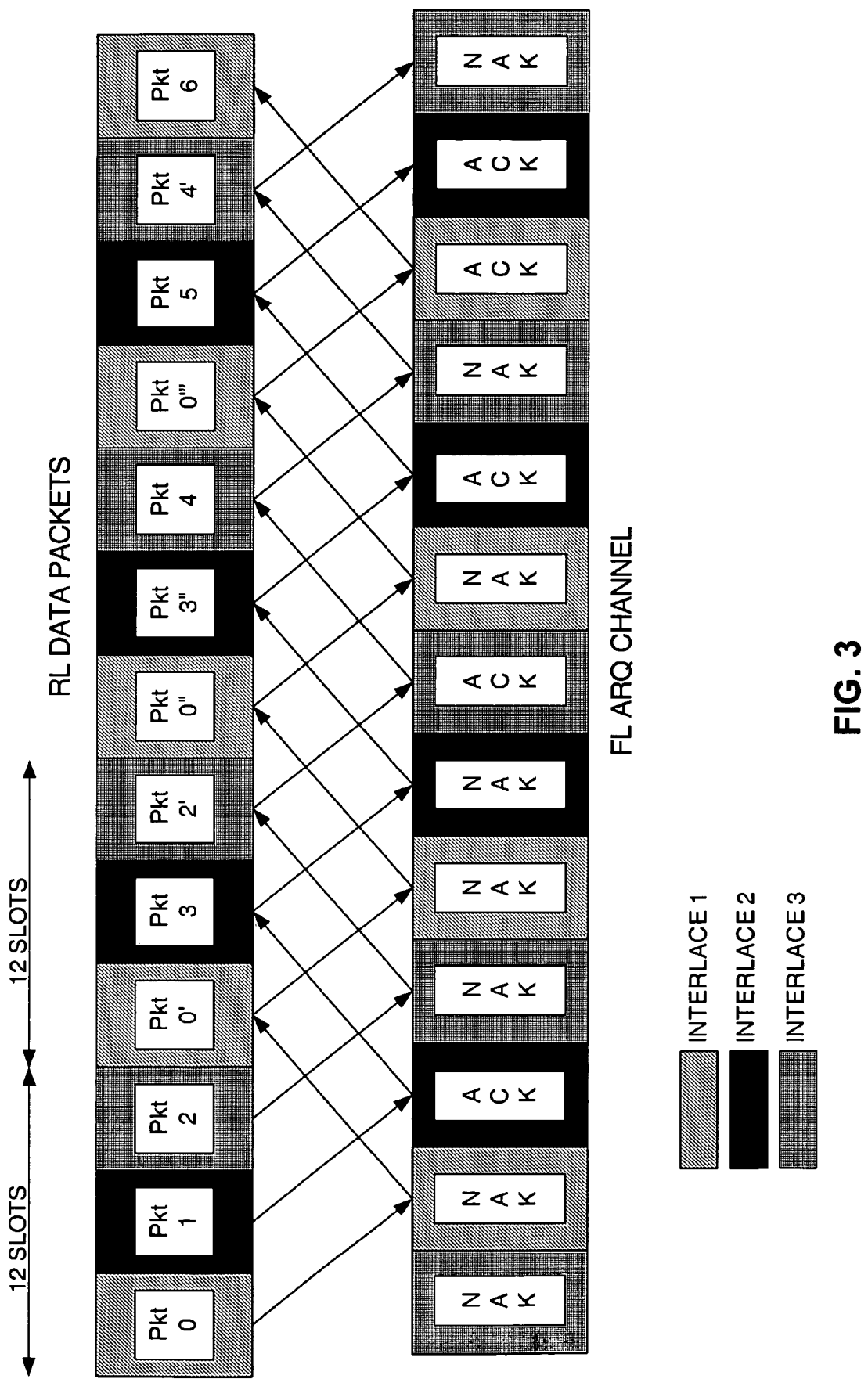
FIG. 3 illustrates an example of a reverse link (RL) data packet transmit channel and a forward link (FL) automatic repeat request (ARQ) channel.

FIG. 3 illustrates an example of a RL data packet transmit channel transmitted by the access terminal 100 and a FL ARQ channel transmitted by the access network 120 of FIG. 1. The access terminal 100 may process each 16-slot data packet into 4 subpackets. The access terminal 100 may transmit the subpackets, one at a time, in an interlaced structure with each subpacket occupying 4 time slots. There may be 8 time slots between two subpackets of the same interlace. Each interlace (interlace 1, interlace 2, interlace 3) comprises a set of time-staggered segments. Each "segment" is 4 time slots long. During each segment of an interlace, the access terminal 100 may transmit a subpacket to the access network 120. During the 8 time slots between the end of a subpacket of a given interlace and the beginning of the next subpacket of the same interlace, the access network 120 tries to decode a packet from the received subpacket(s) and relay an ACK or negative acknowledgement (NAK) to the access terminal 100. Other access terminals may transmit subpackets during segments of the other interlaces.

FIG. 3 also illustrates H-ARQ, e.g., in EV-DO RevA, which allows early termination of a packet transmission. When channel conditions are good for the first one, two or three subpackets, the access network 120 may decode a data packet "early" using only those first one, two or three subpackets. H-ARQ takes advantage of the time-varying nature of fading channels. For example, packet 0 in FIG. 3 fails to decode correctly after the first subpacket, and the access network 120 sends a NAK. Packet 0 is correctly decoded after all 4 subpackets (0, 0', 0" and 0''') are received and processed. The access network 120 then sends an ACK to the access terminal 100. As another example, packet 1 is decoded after only one subpacket is received and processed. The ACK instructs the access terminal 100 not to send the remaining subpacket(s) for packet 1, i.e., early termination, which allows the access terminal 100 to start a new packet (packet 3 in FIG. 3) if desired.

The access network 120 attempts to decode the original packet after each subpacket is received. For example, early termination probabilities may be 10%, 40%, 40%, 9%. Thus, only a fraction of packets are successfully decoded after the first, second and third subpackets are received and processed. Since ~90% of the packets are very likely to fail decoding after the 1st slot or segment, decoder resources devoted to attempting to decode such packets may be wasted. The description below provides a technique to detect packets that are likely to fail decoding so that the access network 120 will not assign resources to decode these packets. The access network 120 may avoid, terminate, suspend or postpone decoding packets that are likely to fail.

Decoding Control

Specifically, the decoder 70 or another unit may compare a measured average pilot signal-to-noise ratio (SNR or Ec/Nt) over the slots when the packet is transmitted against a power control (PC) threshold or setpoint for that access terminal 100.

Figure 4:
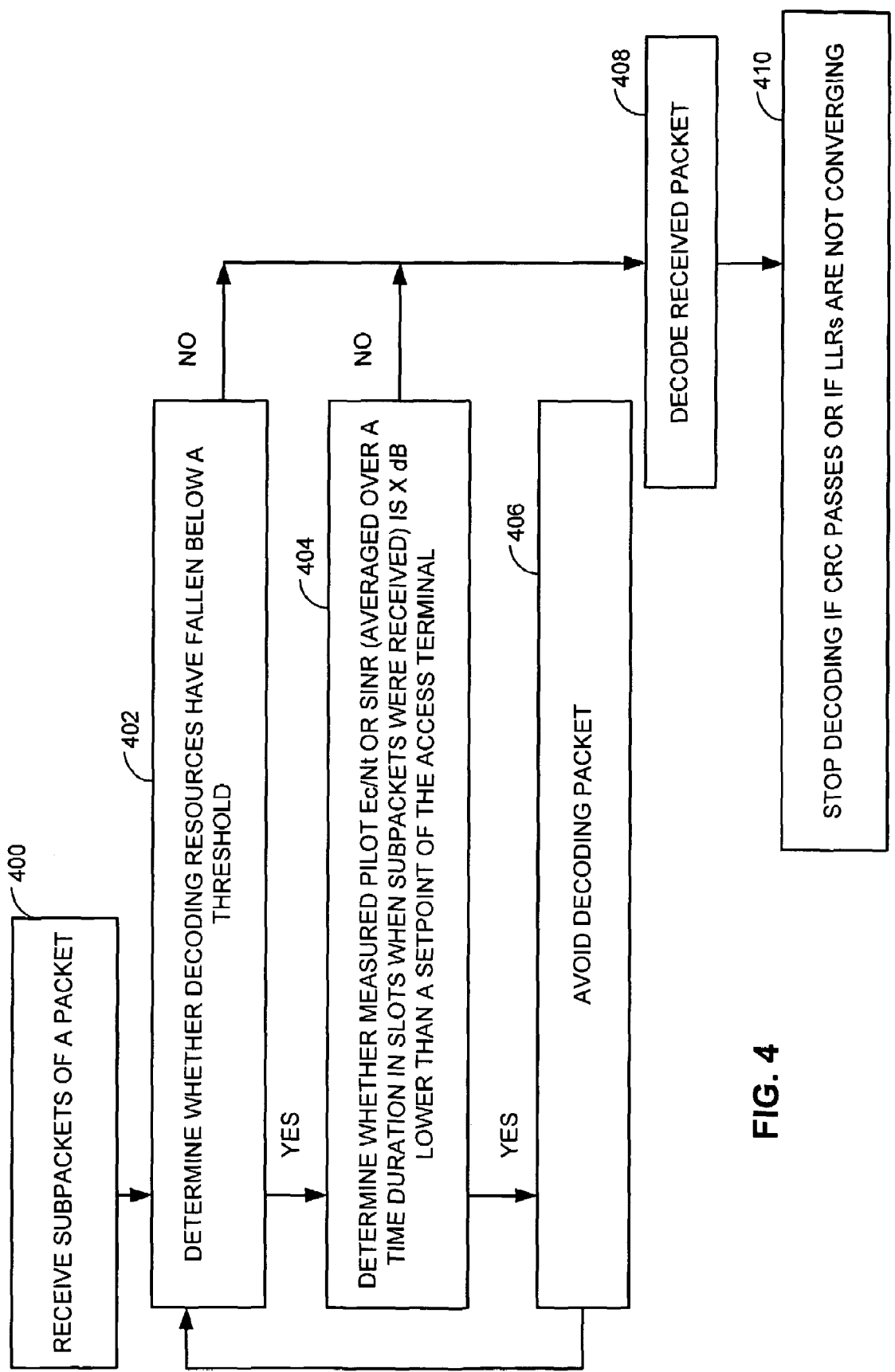
FIG. 4 illustrates a method of decoding a packet received by the access network of FIG. 1.

FIG. 4 illustrates a method of decoding a packet. In block 400, the access network 120 receives one or more subpackets transmitted by the access terminal 100. In block 402, the decoder 70 in FIG. 2B or some other module determines whether one or more available decoding resource(s), such as remaining decoder processing power, idle hardware decoder units, unfilled memory space, etc., have fallen below (or exceed) a threshold, such as 10% of total decoder processing power. If decoding resources have not fallen below the threshold, then in block 408, the decoder 70 attempts to decode the original packet from the received subpacket(s). In block 410, the access network 120 may stop decoding if a packet CRC passes or if LLRs are not converging.

If decoding resources have fallen below the threshold, then in block 404, the decoder 70 determines whether a measured pilot signal-to-noise ratio (SNR or Ec/Nt) or signal-to-interference-and-noise ratio (SINR), averaged over a duration of time slots when the one or more subpackets were received, is X db lower than a PC setpoint of the access terminal 100. For example, a PC setpoint may be around −21 dB. If the measured average Pilot Ec/Nt is less than the PC setpoint by X dB, then packet decoding is likely to fail, and the access network 120 does not assign any decoder resources for the packet. If not, then in block 408, the decoder 70 attempts to decode the original packet from the received one or more subpackets.

X may be a function of packet payload size, transmission mode, and the number of received sub-packets. For example, X may be higher or lower depending on whether the access network 120 has received one, two or three subpackets. For example, X may be −6 to −2 dB. It may be desirable to know the transmission mode of the arriving packets since different X thresholds may be used for different transmission modes. In case of 16-slot transmission mode, an X threshold in the range of −4 dB~−2 dB can be applied. But in case of 8-slot transmission mode, an X threshold of about −6 dB may be used to avoid significant loss in sector throughput.

If the measured pilot SNR, Ec/Nt or SINR, averaged over the time slots when one or more subpackets were received, is X db lower than the setpoint of the access terminal 100, then in block 406, the decoder 70 avoids, terminates, suspends or postpones decoding the packet. For example, the decoder 70 may wait until more subpackets (corresponding to the original packet) are received before attempting to decode the packet.

The method of FIG. 4 may be described as using criteria, such as pilot channel conditions, to start and stop packet decoding. The method can reduce a number of decoding iterations.

The method of FIG. 4 may be implemented in a multi-carrier EV-DO communication system. A "multi-carrier" system described herein may use frequency division multiplex to transmit signals between the access terminal 100 and access network 120, wherein each "carrier" corresponds to a radio frequency range. For example, a carrier may be 1.25 Megahertz wide. Other carrier frequency sizes may be used. A carrier may also be called a CDMA carrier, a link or a CDMA channel.

Significant savings in decoder energy may be achieved for high-capacity (i.e., 16-slot termination) mode packets by choosing not to decode some of the first subpackets. Even if a "miss" type error event occurs (where a good first subpacket could have been decoded but is not), its effect on overall throughput may be negligible since probability of decoding the first subpacket is very small. However, since first subpackets contribute to the largest fraction of received packets, and decoding it cost the same amount of energy as decoding after receiving any other subpackets, the energy savings of the above method can be very significant.

The method and apparatus described above may be implemented with an access network 120 with multiple receive antennas, such as two or four receive antennas.

Figure 5:
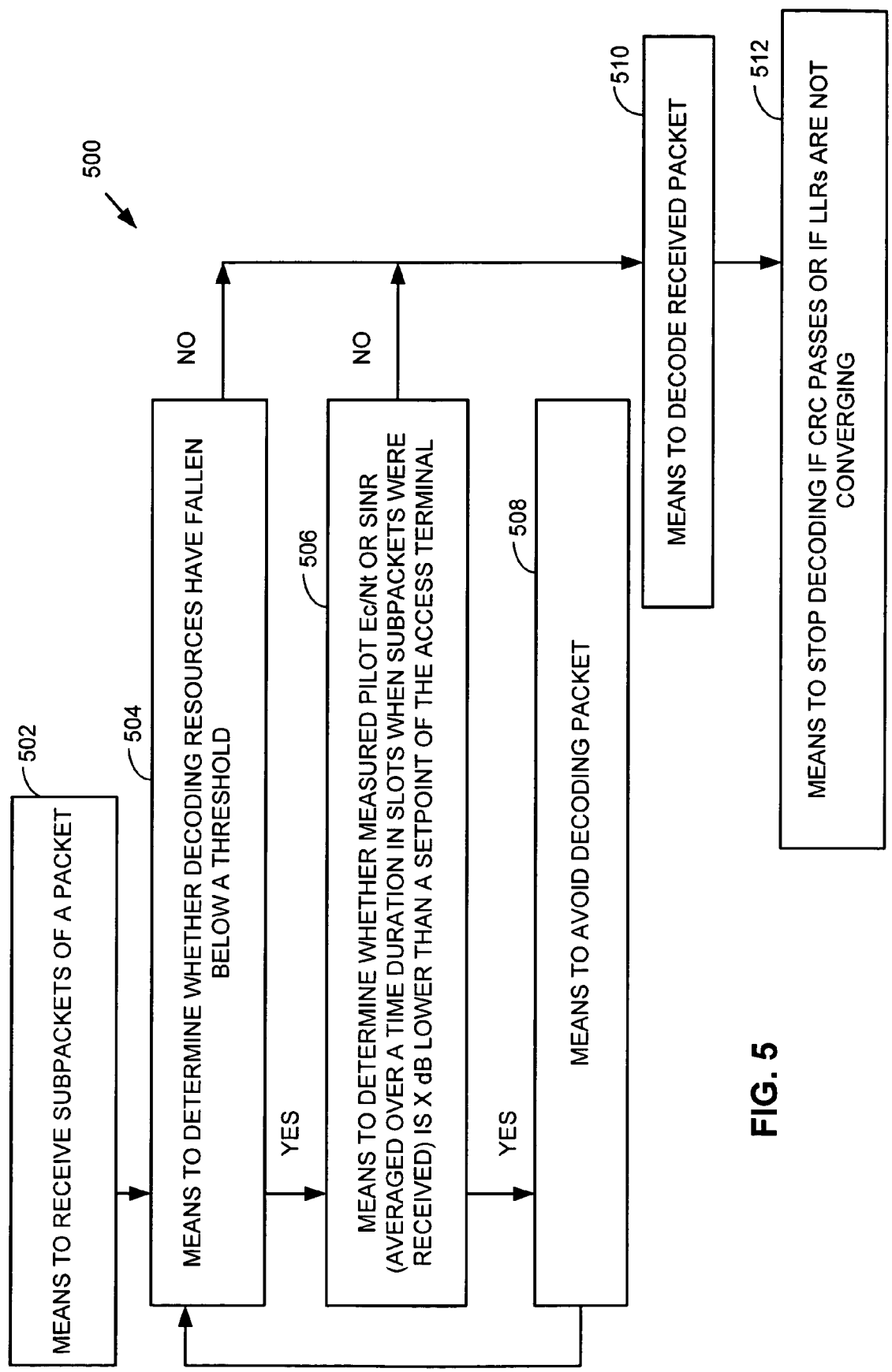
FIG. 5 illustrates a device configured to implement the method of FIG. 4.

FIG. 5 illustrates a device 500 configured to implement the method of FIG. 4. The device comprises a means 502 to receive one or more subpackets; a means 504 to determine whether decoding resources have fallen below a threshold; a means 506 to determine whether a measured pilot signal-to-noise ratio, averaged over a duration of time slots when the one or more subpackets were received, is lower than a power control setpoint by a predetermined amount; a means 508 to avoid or stop an attempt to decode an original packet from the received one or more subpackets if the measured pilot signal-to-noise ratio is lower than the power control setpoint by the predetermined amount; a means 510 to attempt to decode the original packet from the received one or more subpackets if the measured pilot signal-to-noise ratio is above the power control setpoint by the predetermined amount; and a means 512 to stop decoding.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC and the ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of decoding, the method comprising:
 receiving one or more subpackets;
 determining whether one or more decoding resources have fallen below a threshold;
 determining whether a measured pilot signal-to-noise ratio, averaged over a duration of time slots when the one or more subpackets were received, is lower than a power control setpoint by a predetermined amount;
 avoiding an attempt to decode an original packet from the received one or more subpackets if one or more decoding resources have fallen below the threshold and the measured pilot signal-to-noise ratio is lower than the power control setpoint by the predetermined amount; and
 attempting to decode the original packet from the received one or more subpackets if either one or more decoding resources have not fallen below the threshold or if the measured pilot signal-to-noise ratio is above the power control setpoint by the predetermined amount.

2. The method of claim 1, wherein the one or more decoding resources comprises decoder processing power.

3. The method of claim 1, further comprising determining the predetermined amount according to at least one of packet payload size, transmission mode, and a number of received sub-packets.

4. The method of claim 1, further comprising waiting until more subpackets are received to attempt to decode the original packet from the received subpackets.

5. The method of claim 1, further comprising:
 sending an acknowledgement to the access terminal when the packet has successfully decoded; and
 sending a negative acknowledgement to the access terminal when the packet has failed to decoded correctly.

6. An apparatus comprising a receiver configured to:
 receive one or more subpackets;
 determine whether one or more decoding resources have fallen below a threshold;
 determine whether a measured pilot signal-to-noise ratio, averaged over a duration of time slots when the one or more subpackets were received, is lower than a power control setpoint by a predetermined amount;
 avoid an attempt to decode an original packet from the received one or more subpackets if one or more decoding resources have fallen below the threshold and the measured pilot signal-to-noise ratio is lower than the power control setpoint by the predetermined amount; and
 attempt to decode the original packet from the received one or more subpackets if either one or more decoding resources have not fallen below the threshold or if the measured pilot signal-to-noise ratio is above the power control setpoint by the predetermined amount.

7. The apparatus of claim 6, wherein the one or more decoding resources comprises decoder processing power.

8. The apparatus of claim 6, wherein the receiver is further configured to determine the predetermined amount according to at least one of packet payload size, transmission mode, and the number of received sub-packets.

9. The apparatus of claim 6, wherein the receiver is further configured to wait until more subpackets are received to attempt to decode the original packet from the received subpackets.

10. The apparatus of claim 6, wherein the receiver is further configured to:
 send an acknowledgement to the access terminal when the packet has successfully decoded; and send a negative acknowledgement to the access terminal when the packet has failed to decoded correctly.

11. A system comprising:
 means for receiving one or more subpackets;
 means for determining whether one or more decoding resources have fallen below a threshold;
 means for determining whether a measured pilot signal-to-noise ratio, averaged over a duration of time slots when the one or more subpackets were received, is lower than a power control setpoint by a predetermined amount;
 means for avoiding an attempt to decode an original packet from the received one or more subpackets if one or more decoding resources have fallen below the threshold and the measured pilot signal-to-noise ratio is lower than the power control setpoint by the predetermined amount; and
 means for attempting to decode the original packet from the received one or more subpackets if either one or more decoding resources have not fallen below the threshold or if the measured pilot signal-to-noise ratio is above the power control setpoint by the predetermined amount.

12. The system of claim 11, wherein the one or more decoding resources comprises decoder processing power.

13. The system of claim 11, further comprising means for determining the predetermined amount according to at least one of packet payload size, transmission mode, and the number of received sub-packets.

14. The system of claim 11, further comprising means for waiting until more subpackets are received to attempt to decode the original packet from the received subpackets.

15. The system of claim 11, further comprising:
 means for sending an acknowledgement to the access terminal when the packet has successfully decoded; and
 means for sending a negative acknowledgement to the access terminal when the packet has failed to decoded correctly.

16. A tangible storage medium having stored thereon processor-executable software instructions configured to cause a processor to perform steps comprising:
 receiving one or more subpackets;
 determining whether one or more decoding resources have fallen below a threshold;
 determining whether a measured pilot signal-to-noise ratio, averaged over a duration of time slots when the one or more subpackets were received, is lower than a power control setpoint by a predetermined amount;
 avoiding an attempt to decode an original packet from the received one or more subpackets if one or more decoding resources have fallen below the threshold and the measured pilot signal-to-noise ratio is lower than the power control setpoint by the predetermined amount; and attempting to decode the original packet from the received one or more subpackets if either one or more decoding resources have not fallen below the threshold or if the measured pilot signal-to-noise ratio is above the power control setpoint by the predetermined amount.

17. The tangible storage medium of claim 16, wherein the one or more decoding resources comprises decoder processing power.

18. The tangible storage medium of claim 16, wherein the tangible storage medium has processor-executable software instructions configured to cause a processor to perform further steps comprising:

determining the predetermined amount according to at least one of packet payload size, transmission mode, and a number of received sub-packets.

19. The tangible storage medium of claim 16, wherein the tangible storage medium has processor-executable software instructions configured to cause a processor to perform further steps comprising:

waiting until more subpackets are received to attempt to decode the original packet from the received subpackets.

20. The tangible storage medium of claim 16, wherein the tangible storage medium has processor-executable software instructions configured to cause a processor to perform further steps comprising:

sending an acknowledgement to the access terminal when the packet has successfully decoded; and sending a negative acknowledgement to the access terminal when the packet has failed to decoded correctly.

* * * * *